(12) United States Patent
Ma et al.

(10) Patent No.: US 7,869,935 B2
(45) Date of Patent: Jan. 11, 2011

(54) METHOD AND SYSTEM FOR DETECTING TRAFFIC INFORMATION

(75) Inventors: Xin-yu Ma, Beijing (CN); Huixing Jia, Beijing (CN)

(73) Assignee: Agilent Technologies, Inc., Santa Clara, CA (US)

( * ) Notice: Subject to any disclaimer, the term of this patent is extended or adjusted under 35 U.S.C. 154(b) by 963 days.

(21) Appl. No.: 11/726,920

(22) Filed: Mar. 23, 2007

(65) Prior Publication Data
US 2007/0225895 A1  Sep. 27, 2007

(30) Foreign Application Priority Data
Mar. 23, 2006  (CN) .................. 2006 1 0065374

(51) Int. Cl.
*G06G 1/00* (2006.01)
(52) U.S. Cl. ...................... 701/117; 701/118
(58) Field of Classification Search ............... 701/117, 701/118, 119, 300; 340/907, 909, 937; 348/135, 348/139
See application file for complete search history.

(56) References Cited

U.S. PATENT DOCUMENTS

| | | | |
|---|---|---|---|
| 6,690,292 B1 | 2/2004 | Meadows et al. | |
| 7,348,895 B2 * | 3/2008 | Lagassey | ................... 340/907 |
| 7,697,727 B2 * | 4/2010 | Xu et al. | ..................... 382/108 |
| 2004/0131233 A1 | 7/2004 | Comaniciu et al. | |

FOREIGN PATENT DOCUMENTS

| | | |
|---|---|---|
| AU | 2004231240 A1 | 12/2004 |
| CN | 1187724 | 1/2004 |
| EP | 1429302 A1 | 6/2004 |
| EP | 0807914 A1 | 11/2007 |
| GB | 2393837 A | 4/2004 |
| GB | 2425385 A | 10/2006 |
| WO | 2007036873 | 4/2007 |

OTHER PUBLICATIONS

GB Examination Report dated Jun. 17, 2009.
UK Intellectual Property Office, Correspondence dated Jul. 2, 2007.

* cited by examiner

*Primary Examiner*—Richard M. Camby

(57) ABSTRACT

A traffic information sensor system includes an image acquisition device to generate video images of a traffic scene. The system also includes an image detection device to extract traffic information from the video images in connection with the lane position information of the traffic scene. The system also includes an information transfer device to transmit the extracted traffic information instead of the video images to a traffic management center. A traffic information detection method and system is also described.

19 Claims, 7 Drawing Sheets

METHOD AND SYSTEM FOR DETECTING TRAFFIC INFORMATION

TECHNICAL FIELD

The technical field of the present invention relates to a traffic information sensing and detection.

BACKGROUND

Traffic information detection systems using existing video image detection systems (VIDS) have many advantages. For example, such detection systems typically use video cameras as sensors, thus having wide area detection capabilities. Usually, one camera can cover several traffic lanes, which is difficult to achieve using any other sensors like radar or is conductive loops. While images generated by video camera sensors allow for efficient detection of shock waves and other spatial traffic parameters, such as density, queue lengths, and speed profiles, it is typically not the case for images generated by other conventional means. In addition, the VIDS provides ancillary information such as traffic on road shoulders, stopped vehicles, changed lanes, speed variations between vehicles, and traffic slowdowns in the other direction. As the size of camera sensors decreases and processing capabilities of processors increase, it is more and more common to employ traffic information detection systems with VIDS.

FIG. 1 illustrates a block diagram of the prior art traffic information detection system using VIDS. One disadvantage with this prior art traffic information detection system is that as shown in the figure, all the video sensors need to transfer video stream data from the fields where the sensors are located to the traffic management center. This makes the video images acquired by each of the camera sensors subject to video compression when transmitted to the traffic management center. In this case, expensive real-time decoders are used to decompress the compressed video images at the receiving end, thus making the prior art traffic detection system relatively more expensive. Another contributing factor to the relatively expensive traffic detection system is that due to the relatively high code rate of the compressed video stream, a large amount of network bandwidths are required to transmit even the compressed video stream.

Another disadvantage of the prior art traffic detection system is that the sensors cannot identify traffic lanes automatically, thus requiring operating personnel manually obtain lane information from the sample images during installation. The lane information is also transmitted back to the traffic management center for subsequent detection. For a traffic is detection system that includes thousands of sensors, such activities involve an enormous amount of labor. Moreover, once the position or orientation of a sensor is changed, the lane information will have to be re-configured; otherwise erroneous detection results will be generated. Thus, the lack of automatic lane identification capability of the prior art sensors has brought great inconvenience to traffic information detections.

SUMMARY

A traffic information sensor system includes an image acquisition device to generate video images of a traffic scene. The system also includes an image detection device to extract traffic information from the video images in connection with lane position information of the traffic scene. The system also includes an information transfer device to transmit the extracted traffic information instead of the video images to a traffic management center.

BRIEF DESCRIPTION OF THE DRAWINGS

In the accompanying drawings, like reference symbols refer to like devices.

DETAILED DESCRIPTION

Figure 1:
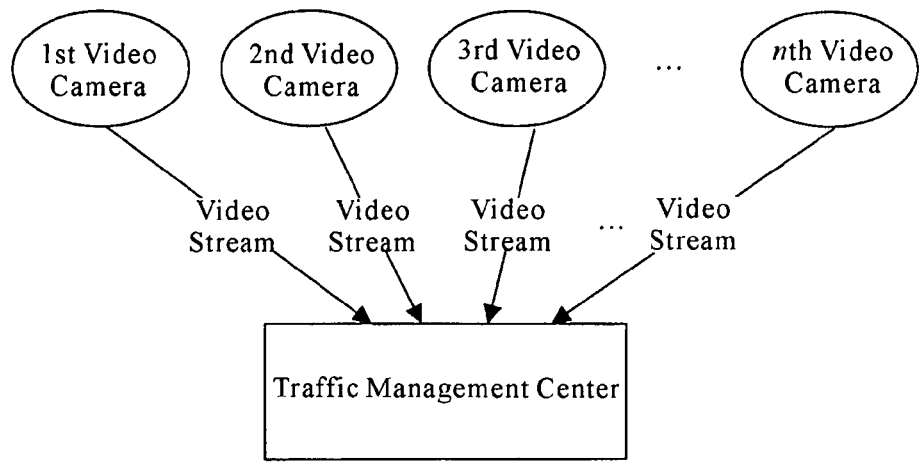
FIG. 1 is a block diagram depicting a prior art traffic information detection system.
Figure 2:
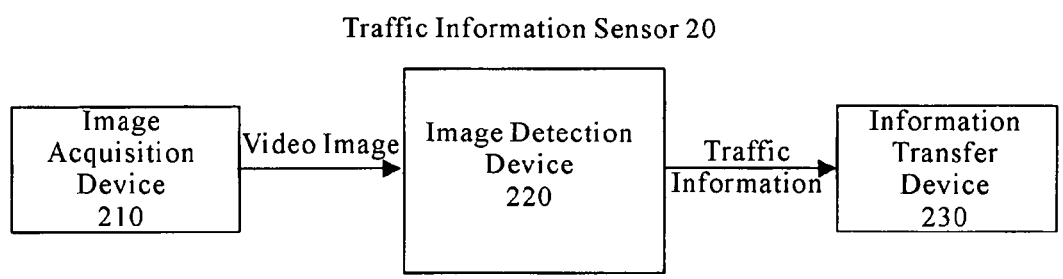
FIG. 2 is a block diagram depicting a traffic information sensor system according to an embodiment of the present invention.

FIG. 2 shows a block diagram of a traffic information sensor 20 according to an embodiment of the present invention. The traffic information sensor 20 includes an image acquisition device 210, an image detection device 220, and an information transfer device 230.

The image acquisition device 210 that is coupled to the image detection device 220 can be, for example, a video camera, a CMOS (Complementary Metal Oxide Semiconductor) video camera, a CCD (Charge Coupled Device) video camera, or a WebCam camera, and is operable to acquire digital video images of the traffic scene (e.g. a road) continuously.

Figure 3:
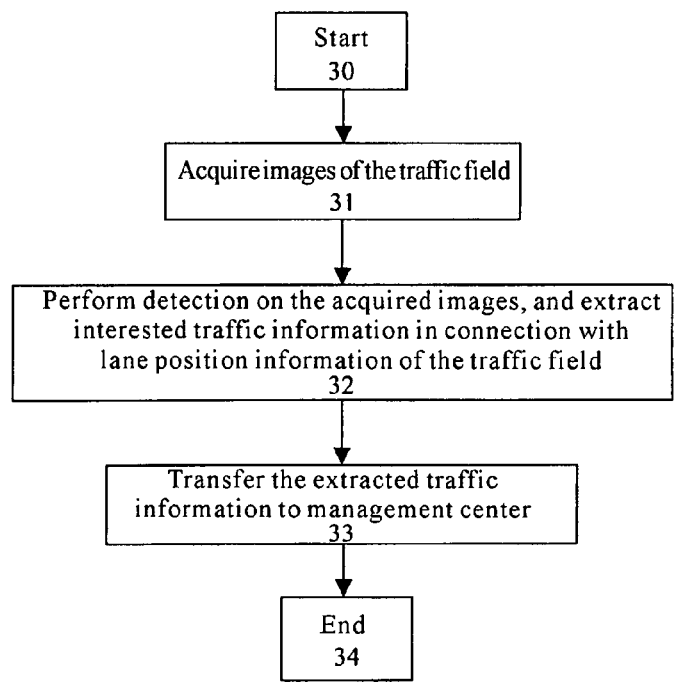
FIG. 3 depicts a traffic information detection method executed by the traffic information sensor system of FIG. 2.

The image detection device 220 is, for example, an embedded processor, an application specific integrated circuit, a system-on-chip or a general-purpose computer that is programmed to execute particular image detection software instructions for (I) performing detection on the images acquired by the image acquisition device 210, (II) extracting interested traffic information (e.g. the average speed in each lane, and the number of vehicles passing each lane in a given period of time) in connection with lane position information in the traffic scene, and (III) transferring the extracted traffic information to the information transfer device 230 in a digital data signal form. FIG. 3 shows in more detail the functions of the software instructions within the device 220, which will be described in more detail below.

Referring again to FIG. 2, the information transfer device 230 can be a wireless public network transmitting device in compliance with the standard of, for example, GSM (Global System for Mobile Communications), GPRS (General Packet Radio Service), CDMA (Code Division Multiple Access), or WiMAX (World Interoperability for Microwave Access). The device 230 can also be a wired network transmitting device that is in compliance with the standard of, for example, Ethernet or ATM, and is coupled to the image detection device 220 for transferring the traffic information extracted by the image detection device 220 to a management center through a communication network (shown in FIG. 12).

In FIG. 3, the image acquisition device 210 acquires images of the traffic scene at 31. At 32, the image detection device 220 performs detection on the acquired images, and extracts interested traffic information such as the number of vehicles and the average speed of vehicles from the images in connection with the lane position information of the traffic scene. For example, the image detection device 220 may set a plurality of virtual lines in different positions in an interested lane and detect vehicles that pass the virtual lines by detecting the pixel changes on the virtual lines in the video images in order to obtain the count of vehicles of that lane, as will be described in more detail later. Alternatively, it may set one virtual line on the interested lane, detect the time a vehicle takes to pass the virtual line by detecting the pixel changes on the virtual line in the video images, and then obtain the average speed of vehicles on the lane in connection with the statistics average value of the vehicle lengths, as will be described in more detail below. Further, the device 220 may monitor the congestion status on the road based on the calculated number of vehicles or average speed of vehicles, transfer information regarding the congestion to the traffic management center in order to facilitate coordination and management, and so on. In Step 33, the information transfer device transfers the extracted traffic information to the management center via a wired or a wireless network.

Referring back to FIG. 2, by use of the traffic information sensor 20 of the present embodiment, a single traffic management center may host thousands of remote sensors. As compared with the prior art, the present embodiment only needs to transfer to the traffic management center the extracted traffic information instead of the video images, thus eliminating the need to perform complex video compression or video transmission, whereby reducing the required network bandwidth significantly. In addition, the present embodiment performs detection on the video images locally at the respective sensors instead of transferring the video images to the traffic management center for centralized processing, thus enabling a more timely acquisition of the required traffic information.

Figure 4:
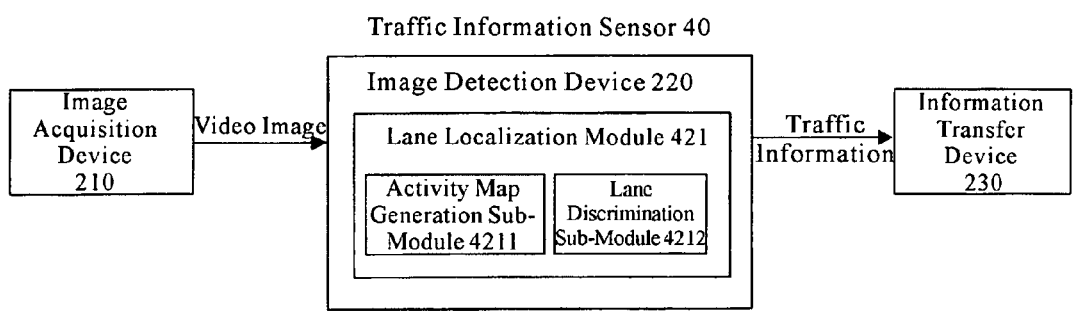
FIG. 4 is a block diagram depicting a traffic information sensor system having a lane localization module to detect and obtain traffic lane position information from the video images acquired by the sensor system in accordance with another embodiment of the present invention, wherein the lane localization module includes an activity map generation sub-module and a lane discrimination sub-module.

The lane position information in this embodiment may be set in advance, or may be obtained from the video images by the sensor. FIG. 4 shows a block diagram of a traffic information sensor 40 having a lane localization module 421 according to another embodiment of the present invention, wherein the lane localization module 421 is operable to perform feature extraction and pattern identification on the images acquired by the image acquisition device in order to obtain the lane position information of the traffic field. The devices illustrated in FIG. 4 are the same as that illustrated in FIG. 2 except that the lane localization module 421 is provided in the image detection device 420.

The lane localization module 421 localizes the lanes by use of various known methods, e.g. by analyzing vehicle tracks or road marks in the images. For example, lanes are found by least squares polynomial fit with regard to vehicle movement tracks in the images as disclosed in José Melo, Andrew Naftel, Alexandre Bernardino and José Santos-Victor, "Viewpoint Independent Detection of Vehicle Trajectories and Lane Geometry from Uncalibrated Traffic Surveillance Cameras", *ICIAR* 2004, *LNCS* 3212, pp. 454-462, 2004. Lanes are found by identification of road marks on the lanes in the images as disclosed in Andrew H. S. Lai and Nelson H. C. Yung, " Lane Detection by Orientation and Length Discrimination", *IEEE Transactions on Systems, Man, and Cybernetics—Part B: Cybernetics*, Vol. 30, No. 4, August 2000.

Here, as examples, accumulation of difference images between adjacent frames is used to perform lane localization and lane discrimination. This calculation utilizes the fact that most vehicles follow their path and do not change the lane when they pass the camera view field. Specifically, the lane localization module 421 includes two sub-modules, namely an activity map generation sub-module 4211 and a lane discrimination sub-module 4212. First, the activity map generation sub-module 4211 distinguishes two adjacent frames and detects some active pixels whose values are above a threshold, the active pixels indicating the movements of the vehicles. Accumulation of such active pixels during the initialisation period will form an activity map. Thereafter, the lane discrimination sub-module 4212 determines the middle lines of the lanes and the boundaries between the lanes by finding the local minimum and maximum values in the activity map. The operations of the aforementioned two sub-modules will be described in more detail with reference to FIG. 5 and FIG. 6 below.

Figure 5:
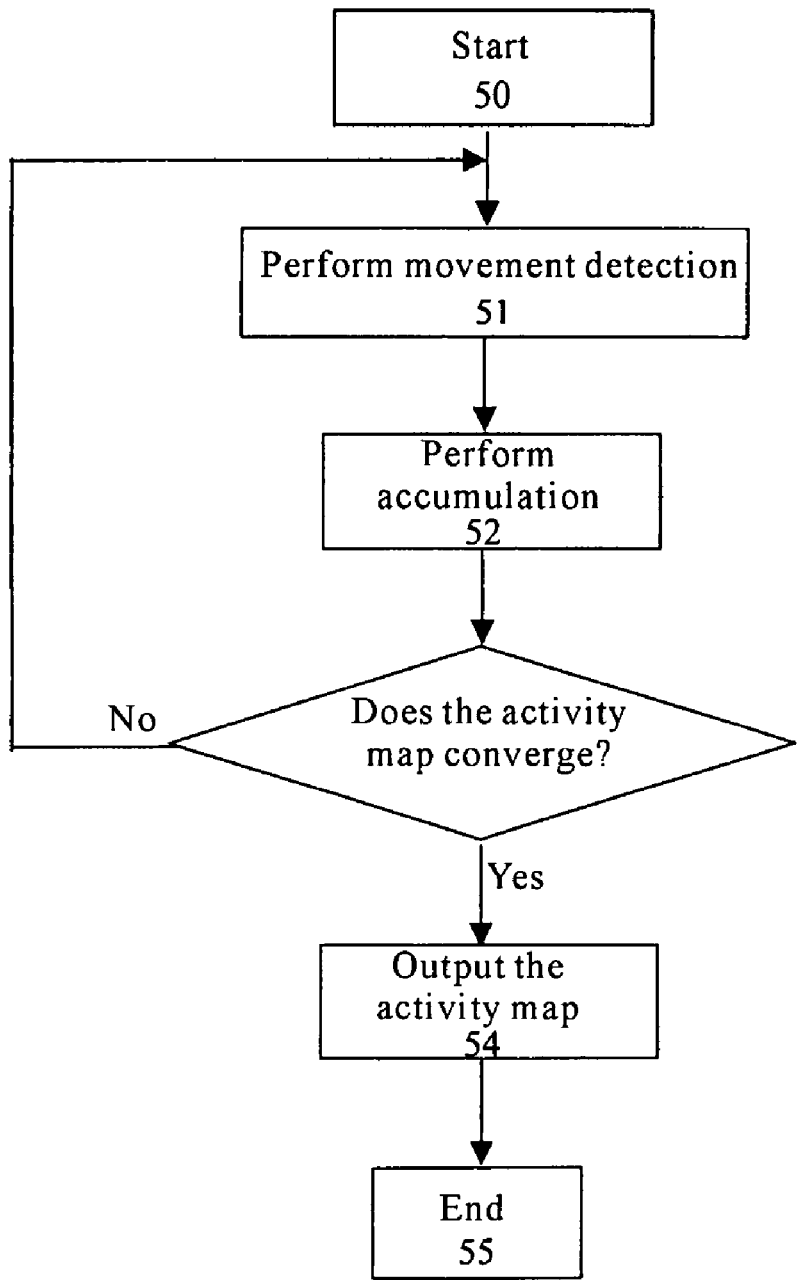
FIG. 5 is a flow chart showing the operation of the activity map generation sub-module of FIG. 4.

The flow chart in FIG. 5 shows the operations of the activity map generation sub-module 4211. At 51, movement detection is performed by the sub-module 4211. The difference between two successive image frames in the video sequence is calculated, and active pixels above a particular threshold are detected by binarization. The binarization is intended to eliminate the effect of noise.

At 52, sub-module 4211 performs accumulation. The activity map is accumulatively added at the positions where the active pixels locate. At 53, it is determined whether or not the map has converged. If so, the activity map is output to 54 so that the present processing can be ended. If it has not converged, the process proceeds back to 51 for the processing of the next frame. The criterion for determining whether the activity map converges is such that it would be deemed converging if the positions of active pixels generated by a number of successive frames are substantially the same as the positions of active pixels on the current activity map.

Figure 6:
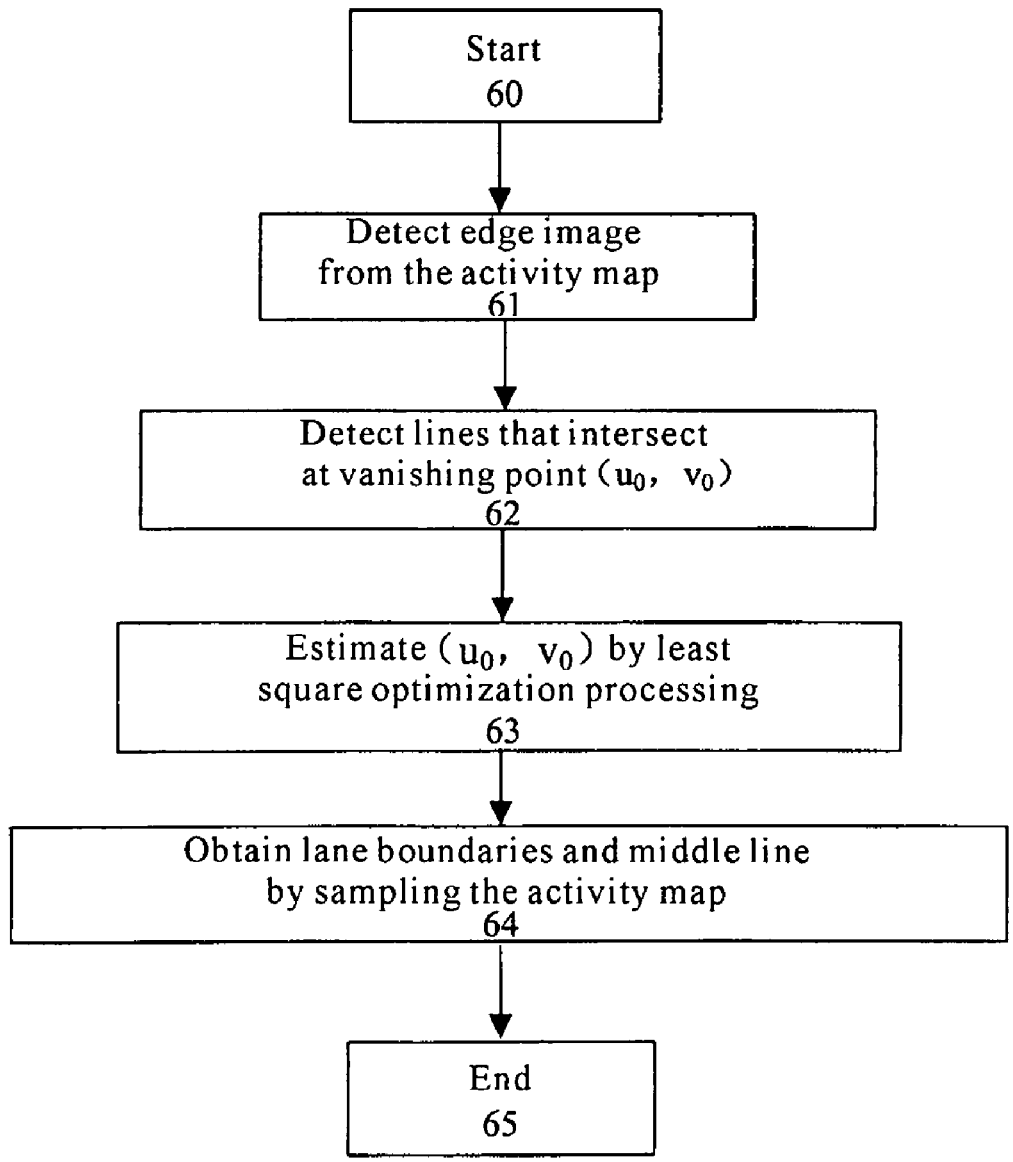
FIG. 6 is a flow chart showing the operation of the lane discrimination sub-module of FIG. 4.

The flow chart of FIG. 6 shows the operations of the lane discrimination sub-module 4212. At 61, the sub-module 4212 establishes a coordination system with the top right vertex of the image as the origin and the horizontal and vertical directions as the u axis and v axis, respectively, and edges are detected on the activity map by using Canny's edge detector, thus obtaining a binary image. The edge points are located where the maximum values and minimum values are present in the activity map, and correspond to the middle lines of the lanes and the boundary lines between the lanes.

After obtaining the binary map (at 61) and at 62, the Hough transform is employed to detect the lines at the vanishing point $(u_0, v_0)$, thus obtaining line equations of the middle lines of the lanes and the boundary lines between the lanes. After detecting the lines (at 62) and at 63, the vanishing point ($u_0$, $v_0$) is estimated by the sub-module 4212 using the least square optimization algorithm.

At 64, the accurate positions of the boundaries and middle line of each of the lanes are further estimated by using the ($u_0$, $v_0$) obtained in 63. Specifically, the activity map is sampled along the lines connecting the vanishing point ($u_0$, $v_0$) and pixel $u_j$ in the bottom row of the image. The activity values along each line are averaged, thus creating a one-dimensional signal that is a function of u. The peaks of the signal indicate strong traffic activity (middles of respective lanes) and the valleys indicate the absence of vehicle activity (lane boundaries), and the accurate positions of the boundaries and middle line of each lane can be obtained by detecting the peak values and valley values, and then connecting the detected values with ($u_0$, $v_0$).

The sub-modules 4211 and 4212 may well use other methods known in the art to generate the activity map and perform the lane discrimination by using the activity map, and these methods will not be described in more detail below.

Figure 7:
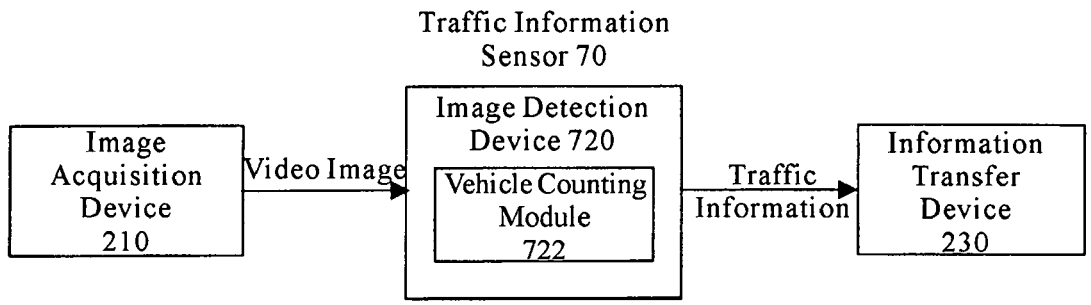
FIG. 7 is a block diagram showing a traffic information sensor system having a vehicle counting module to count the number of vehicles within any of the video images acquired by the sensor system in accordance with yet another embodiment of the present invention.

FIG. 7 shows a block diagram of a traffic information sensor 70 according to yet another embodiment of the present invention. The devices illustrated in FIG. 7 are the same as those illustrated in FIG. 2 except that a vehicle counting module 722 is provided in the image detection device 720.

Figure 8:
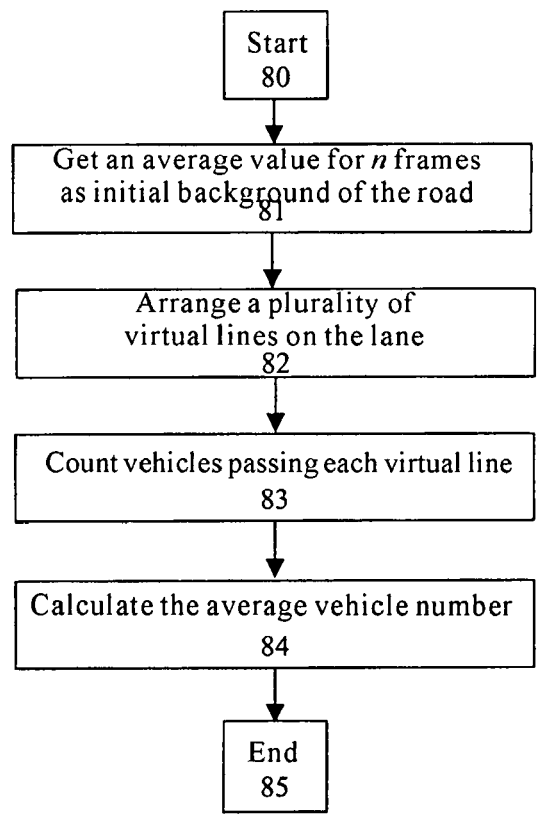
FIG. 8 is a flow chart showing the operation of the vehicle counting module of FIG. 7.

The vehicle counting module 722 performs the operations shown in FIG. 8 to count vehicles with regard to each of the lanes, respectively. The operation is described as follows.

At 81, an average value of n frames (where n is a number that is large enough and may be, for example, 150) of images is calculated by the module 722 as the initial background of the road.

At 82, one or more virtual lines are arranged on the interested lanes by the module 722. Preferably, the virtual lines are arranged on different positions on the middle line of a lane with the virtual lines being perpendicular to the middle line and the two endpoints of each virtual line being located on the two boundaries of the lane, respectively. Of course, the length of the virtual lines may be less than the width of the lane as long as it retains the capability of accurately reflecting the pass of vehicles.

At 83, detection is performed on the pixels in each of the virtual lines, wherein when a vehicle passes a virtual line, the pixels on the virtual line will change from the initial background pixels during several frames. By analyzing the pixel changes in the virtual lines, the two-dimensional image data can be changed into a one-dimensional time signal, thus enabling real-time processing by low-end embedded processors.

At 84, since vehicles may change their lanes and noise may be present in some virtual line, the numbers of vehicles of all the virtual lines that belong to the same lane are preferably averaged so as to obtain the average vehicle number of the lane.

A similar method may be used in night detection situations. At night, the pixel luminance at the head lights of a vehicle is significantly higher than that of other parts, thus in one embodiment, vehicles may be to detected by determining whether or not pixels whose luminance is above a predetermined threshold are present in a virtual line in order to count vehicles. For example, in the situation where the detector pixel values range from 0 to 255, most vehicle lights renders the pixel values 255. Of course there are some vehicle head lights that are less bright, but typically they can get higher than 200. However, the gradation of the road surface is typically lower than 200. Therefore, the predetermined threshold may be set in the pixel value range of 200 to 240. Since the initial background need not be calculated at night, the system efficiency is further improved.

Figure 9:
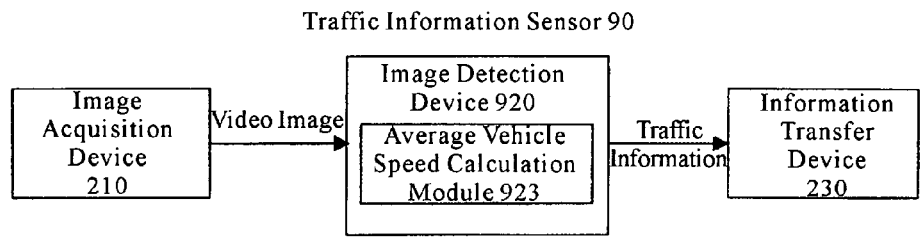
FIG. 9 is a block diagram showing a traffic information sensor system having an average vehicle speed calculation module in accordance with a still yet another embodiment of the present invention.

FIG. 9 shows a block diagram of a traffic information sensor 90 according to yet another embodiment of the present invention. The devices illustrated in FIG. 9 are the same as those illustrated in FIG. 2 except that an average vehicle speed calculation module 923 is provided in the image detection device 920.

The average vehicle speed calculation module 923 adopts the same method as the module 722 to detect vehicles, and uses a statistical method to estimate the average speed of each of the lanes, respectively. Assume that vehicle lengths have a Gaussian distribution with the average value 1, the frame rate is f frames per second, and the average number of frames corresponding to one vehicle passing one virtual line is n, the average vehicle speed can be calculated as $v=1f/n$. Similarly, as described above, the vehicle detection may be performed by detecting whether or not the pixel luminance on the virtual lines exceeds a threshold at night.

Figure 10:
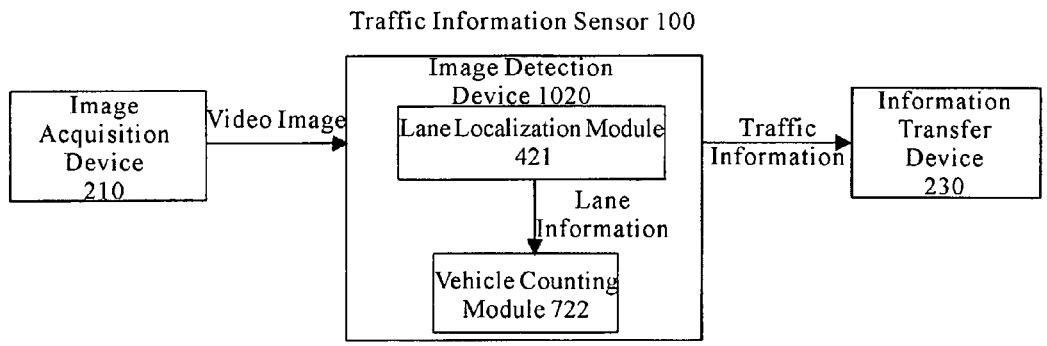
FIG. 10 is a block diagram showing a traffic information sensor system having a lane localization module and a vehicle counting module in accordance with a further embodiment of the present invention.
Figure 11:
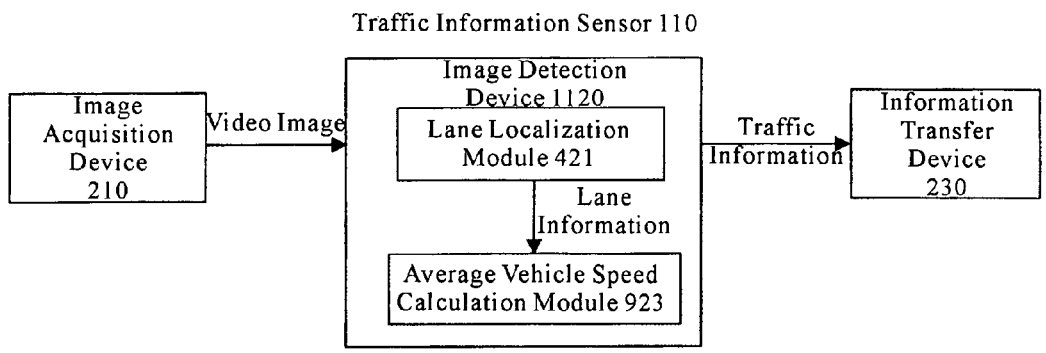
FIG. 11 is a block diagram showing a traffic information sensor system having lane localization module and an average vehicle speed calculation module in accordance with a further embodiment of the present invention.

It is apparent that the modules of the present invention may be combined in various ways. For example, the embodiment shown in FIG. 10 can be obtained by combining the traffic information sensor shown in FIG. 7 with the lane localization module 421 shown in FIG. 4, and the embodiment of FIG. 11 can be obtained by combining the embodiments of FIGS. 4 and 9.

Likewise, the vehicle counting module 722 of FIG. 7 and the average vehicle speed calculation module 923 of FIG. 9 may also be combined together, or be further combined with the lane localization module 421.

Figure 12:
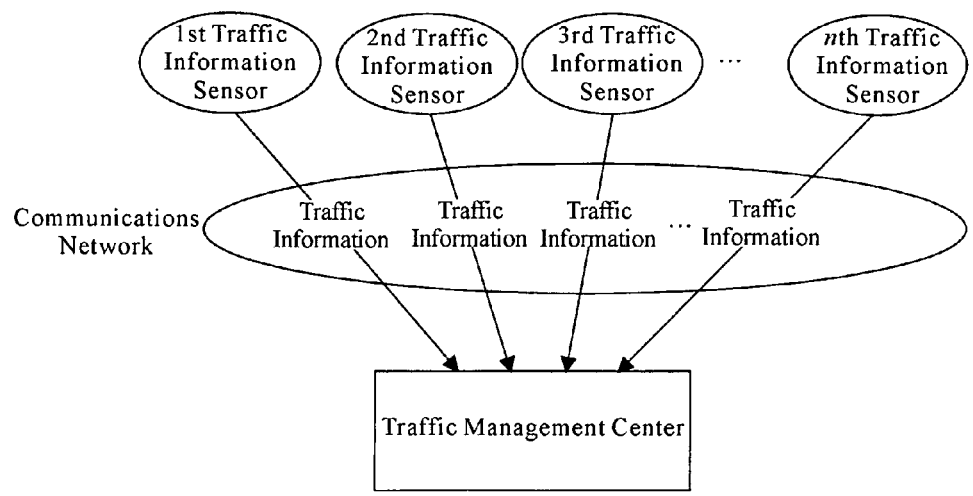
FIG. 12 is a schematic diagram showing a traffic information detection system using the traffic information sensor system in accordance with embodiments of the present invention.

FIG. 12 shows a traffic information detection system utilizing the traffic information sensor of the present invention. In the system, traffic information of the traffic field obtained by the traffic information sensors according to the respective aforementioned embodiments are transferred to the traffic management center through a communications network in a wired or a wireless manner.

Further, the present invention may also use images to determine the circumstances, and select different image processing algorithms according to the circumstances. By using this method, different algorithms may be designed for different weather such as rainy days and foggy days, and for different time such as daytime and dusk.

Although the present invention has been described above in connection with various embodiments, the above descriptions are only illustrative rather than restrictive. It is to be understood by those skilled in the art that various modifications, combinations, sub-combinations and substitutions may be present according to design requirements and other factors as long as they fall within the scope of the appended claims or equivalents thereof.

What is claimed is:

1. A traffic information sensor system, comprising:
    an image acquisition device to generate video images of a traffic scene;
    an image detection device to extract traffic information from the video images in connection with lane position information of the traffic scene; and
    an information transfer device to transmit the extracted traffic information instead of the video images to a traffic management center.

2. The traffic information sensor system of claim 1, wherein the image detection device further comprises a lane localization module to detect and obtain the traffic lane position information from the video images.

3. The traffic information sensor system of claim 2, wherein the lane localization module further comprises an activity map generation sub-module to generate an activity map by accumulating changes among the video images; and a lane discrimination module to obtain the lane position information by detecting local maximum and minimum values in the activity map.

4. The traffic information sensor system of claim 2, wherein the image detection device further comprises a vehicle counting module to count the number of vehicles within an interested lane, as part of the traffic information, of the traffic scene by arranging a plurality of virtual lines at different positions on the lane, and detecting the number of vehicles passing the virtual lines by detecting pixel changes at the virtual lines in the video images in order to obtain the vehicle count of the lane.

5. The traffic information sensor system of claim 4, wherein the pixel changes at the virtual line are determined by calculating an average value of several frames of images as an initial background of the lane and comparing the detected images with the initial background.

6. The traffic information sensor system of claim 4, wherein during night time, vehicles passing the virtual line are detected by detecting pixels whose luminance is higher than a predetermined threshold in the virtual line.

7. The traffic information sensor system of claim 2, wherein the image detection device further comprises an average vehicle speed calculation module to calculate average vehicle speed within an interested lane of the traffic information by arranging a virtual line on the lane, and detecting the time vehicles take to pass the virtual line by detecting pixel changes at the virtual line in the video images in order to obtain the average vehicle speed.

8. The traffic information sensor system of claim 7, wherein the pixel changes at the virtual line are determined by calculating an average value of several frames of images as an initial background of the lane and comparing the detected images with the initial background.

9. The traffic information sensor system of claim 7, wherein during night time, vehicles passing the virtual line are detected by detecting pixels whose luminance is higher than a predetermined threshold in the virtual line.

10. A traffic information detection system, comprising:

A plurality of traffic information sensors, each comprising:
an image acquisition device to generate video images of a traffic scene;
an image detection device to extract traffic information from the video images in connection with lane position information of the traffic scene; and
an information transfer device to transmit the extracted traffic information instead of the video images;

a communications network connected to the information transfer device of each of the sensors to transmit the extracted traffic information to a traffic management center.

11. The traffic information detection system of claim 10, wherein the image detection device further comprises a lane localization module to detect and obtain the traffic lane position information from the video images.

12. The traffic information detection system of claim 11, wherein the lane localization module further comprises an activity map generation sub-module to generate an activity map by accumulating changes among the video images; and a lane discrimination module to obtain the lane position information by detecting local maximum and minimum values in the activity map.

13. The traffic information detection system of claim 11, wherein the image detection device further comprises a vehicle counting module to count the number of vehicles within an interested lane, as part of the traffic information, of the traffic scene by arranging a plurality of virtual lines at different positions on the lane, and detecting the number of vehicles passing the virtual lines by detecting pixel changes at the virtual lines in the video images in order to obtain the vehicle count of the lane.

14. The traffic information detection system of claim 13, wherein the pixel changes at the virtual line are determined by calculating an average value of several frames of images as an initial background of the lane and comparing the detected images with the initial background.

15. The traffic information detection system of claim 13, wherein during night time, vehicles passing the virtual line are detected by detecting pixels whose luminance is higher than a predetermined threshold in the virtual line.

16. The traffic information detection system of claim 11, wherein the image detection device further comprises an average vehicle speed calculation module to calculate average vehicle speed within an interested lane of the traffic information by arranging a virtual line on the lane, and detecting the time vehicles take to pass the virtual line by detecting pixel changes at the virtual line in the video images in order to obtain the average vehicle speed.

17. The traffic information detection system of claim 16, wherein the pixel changes at the virtual line are determined by calculating an average value of several frames of images as an initial background of the lane and comparing the detected images with the initial background.

18. The traffic information detection system of claim 16, wherein during night time, vehicles passing the virtual line are detected by detecting pixels whose luminance is higher than a predetermined threshold in the virtual line.

19. A traffic information detection system, comprising:

generating video images of a traffic scene;

extracting traffic information from the video images in connection with lane position information of the traffic scene; and transmit the extracted traffic information instead of the video images to a traffic management center.

* * * * *